H. L. HAPPER.
ROASTER.
APPLICATION FILED DEC. 9, 1912.
1,092,258.
Patented Apr. 7, 1914.
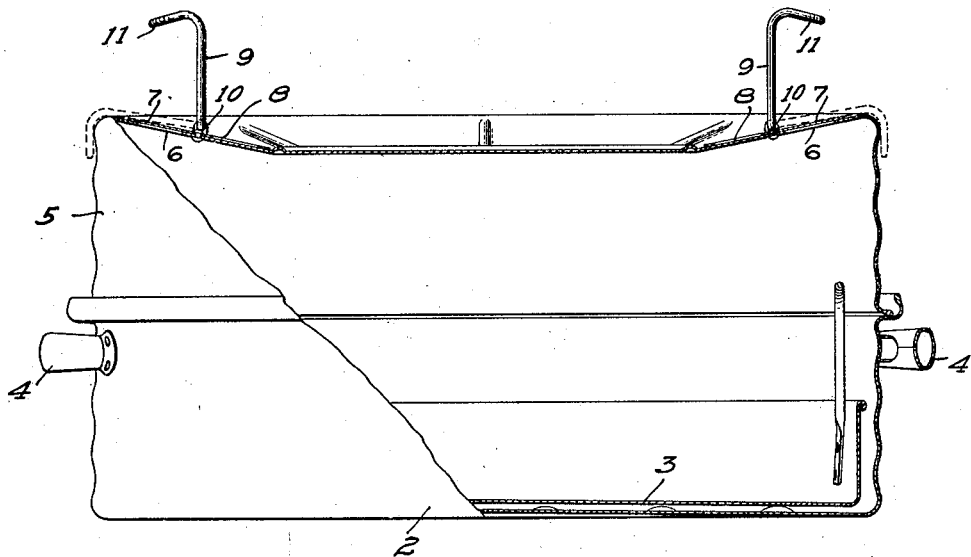
FIG. 1.
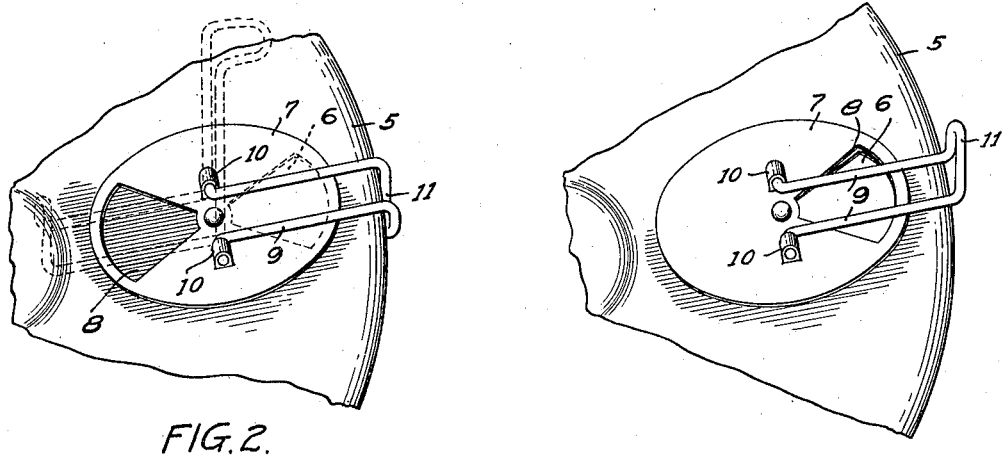
FIG. 2.
FIG. 3.
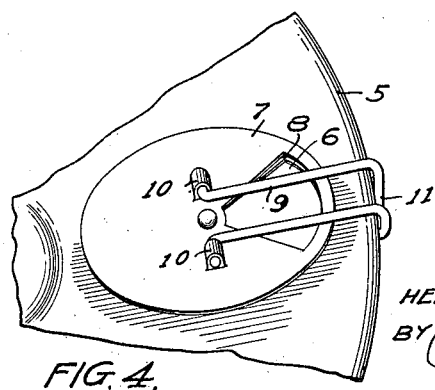
FIG. 4.
WITNESSES
M. R. McInnis
E. A. Paul
INVENTOR
HERVEY L. HAPPER
BY Paul & Paul
ATTORNEYS

UNITED STATES PATENT OFFICE.

HERVEY L. HAPPER, OF MINNEAPOLIS, MINNESOTA.

ROASTER.

1,092,258.  Specification of Letters Patent.  Patented Apr. 7, 1914.

Application filed December 9, 1912. Serial No. 735,861.

*To all whom it may concern:*

Be it known that I, HERVEY L. HAPPER, a citizen of the United States, and resident of Minneapolis, Hennepin county, Minnesota, have invented certain new and useful Improvements in Roasters, of which the following is a specification.

My invention relates to meat roasters and particularly to that type composed of a lower or base section and an upper or cover section which coöperate to form a chamber wherein the roasting pan is placed.

The object of the invention is to provide lifting handles for the upper or cover portion which will allow it to be raised without danger of burning the hands from contact with the steam expelled from the roasting chamber when the roaster is opened.

A further object is to provide improved means for opening or closing the dampers in the top of the cover portion.

A further object is to provide means for locking the dampers in their closed or open position.

Other objects of the invention will appear from the following detailed description.

The invention consists generally in various constructions and combinations, all as hereinafter described and particularly pointed out in the claims.

In the accompanying drawings forming part of this specification, Figure 1 is a side elevation, partially in section, of a roaster embodying my invention, illustrating the lifting handles for the cover in their raised or operative position, Fig. 2 is a detail view, showing the damper and one of the lifting handles in its lowered or locking position, Fig. 3 is a similar view showing one of the lifting handles swung from the full line position in Fig. 2 to the dotted line position in said figure, and the damper rotated to register its opening with the opening in the cover. Fig. 4 is a detail view showing one of the handles in position for locking the damper in its open position.

In the drawing, 2 represents the base of the roaster, adapted to contain a roasting pan 3 and provided at each end with a lifting handle 4.

5 represents the cover or upper portion of the roaster and having a lower edge adapted to rest on a seat provided at the upper edge of the base. The top of the cover is provided with ventilating openings 6, and 7 represents disks preferably of sheet metal, centrally pivoted and having holes 8 therein which are adapted to register with the holes in the cover or when rotated to close the openings in the cover. Usually the cover is provided with end handles corresponding to those on the base of the roaster and utilized for removing the cover from the base. These end handles have been objectionable not only because they have added considerable to the cost of the roaster, but in lifting the cover by them there is great danger of burning the hands from contact with the escaping steam. It has also been found difficult to rotate the dampers from an open to a closed position, or vice versa, and frequently the thin disks have been bent in the rotating operation to such an extent that they did not properly close the openings in the cover and interfered, therefore, with the successful operation of the roaster. Furthermore, no means being provided for locking the dampers, they sometimes moved prematurely and required careful adjustment and attention. To avoid these difficulties and objections, I provide handles 9 of suitable material, preferably spring wire, bent into the form of loops having outwardly turned end portions adapted to slip into eyes 10 formed on the damper disks, preferably by punching loops out of the metal on opposite sides of the center thereof, said handles being free to swing in said loops from a horizontal to a vertical position. The middle portion of each loop has a part 11 bent at right angles substantially to the lower portion and forming a lift for convenience in grasping the handles to lift the cover. If desired, instead of taking hold of the handles direct, the operator may insert a fork or other lifting means into the loops forming the handles and lift the cover in that way if preferred. When the handles are swung down to a horizontal position toward the middle portion of the cover the parts 11 will project upwardly and may be used for rotating the damper disks and shifting them from one position to another. When the parts are swung outwardly to overhang the edge of the cover the parts 11 will extend downwardly and bearing on the side wall of the cover will lock the dampers and prevent their premature or accidental rotation. The handles may thus be used to either lock the dampers in their open or closed position according to the position of the holes in the damper disks with respect to the openings in the cover when the handles are mounted. These handles will not only form a convenient means for lifting the cover but will reduce the cost of the roaster considerably and will also have the further function of facilitating the operation of the dampers and locking them and preventing them from being bent or twisted out of their proper position.

In Fig. 4 I have shown one of the handles 9 reversed from the position shown in Fig. 3 to permit the damper to be locked in its open position. This reversal of the handle is obtained by disengaging it from the loop 10, and turning it over.

In various ways the details of the construction may be modified, such as, for instance, in the form of the handle and the manner of mounting it on the damper, and I do not, therefore, wish to be confined to the particular construction herein shown and described.

I claim as my invention:

1. A cooking utensil comprising a base, a cover therefor provided with ventilating openings, rotating damper disks having openings therein to register with the openings in said cover, said disks having ears thereon and lifting handles consisting of elongated loops of spring material having ends journaled in said ears and laterally turned portions for convenience in lifting.

2. A roaster comprising a base, an upper or cover portion seated thereon having ventilating holes therein and apertured rotating dampers for closing said holes, said dampers being centrally pivoted and having ears upon opposite sides of their pivots and loops having their ends journaled in said ears and adapted to lie flat upon said disks or be raised to an upright lifting position with respect thereto.

3. A roaster comprising a base, an upper or cover portion seated thereon and having ventilating holes therein and apertures rotating dampers for closing said holes, elongated lifting loops pivoted on said rotating dampers and adapted to swing to an upright lifting position, said loops having laterally turned end portions adapted when swung outwardly to engage the walls of the cover and lock said dampers and when swung inwardly to a horizontal position to form a means for conveniently rotating said dampers.

4. A cooking utensil comprising a base, an upper or cover portion resting thereon provided with ventilating openings and rotating dampers for closing said openings, said dampers being located near the ends of said cover, and handles mounted on said dampers for rotating them or lifting said cover, said handles having means to engage the end walls of said cover and lock said dampers.

5. A cooking utensil comprising a base, an upper or cover portion resting thereon provided with ventilating openings near its ends and rotary disk dampers mounted on said cover and having openings therein adapted to register with the openings in said cover or be moved out of register with said openings, handles mounted on said disks and free to swing thereon, said handles having means for locking said dampers either in their closed or open position.

6. A roaster comprising a base, an upper or cover portion seated thereon and having ventilating holes therein, and apertured rotating dampers for closing said holes, elongated lifting loops pivoted on said rotating dampers and adapted to lie flat upon said dampers or swing to an upright lifting position and having means for locking said dampers against premature rotary movement.

7. A cooking utensil comprising a base and cover therefor having ventilating openings, centrally pivoted disks having openings therein to register with the openings in said cover and adapted to rotate and close said cover openings, and handles pivoted on said disks on opposite sides of the disk pivots and having laterally turned portions for convenience in rotating said disks and lifting said cover.

In witness whereof, I have hereunto set my hand this 30th day of November 1912.

HERVEY L. HAPPER.

Witnesses:
GENEVIEVE E. SORENSEN,
EDWARD A. PAUL.

---

Copies of this patent may be obtained for five cents each, by addressing the "Commissioner of Patents, Washington, D. C."